United States Patent [19]

Ory et al.

[11] Patent Number: 5,140,626
[45] Date of Patent: Aug. 18, 1992

[54] PAGING SYSTEM FOR ESTABLISHING TELEPHONE CONNECTION BETWEEN CALLING PARTY AND PAGED PARTY

[75] Inventors: Andrew D. Ory, 30 Appleton St., Somerville, Mass. 02144; Mark L. Kettering, Bedford, Mass.

[73] Assignee: Andrew D. Ory, Somerville, Mass.

[21] Appl. No.: 541,843

[22] Filed: Jun. 21, 1990

[51] Int. Cl.$^5$ ............................................. H04M 11/00
[52] U.S. Cl. ........................................ 379/57; 379/56; 379/67; 379/201
[58] Field of Search ...................... 379/56, 57, 67, 88, 379/89, 201, 211, 212, 217, 373; 340/825.44

[56] References Cited

U.S. PATENT DOCUMENTS

| | | |
|---|---|---|
| 4,644,351 | 2/1987 | Zabarsky et al. |
| 4,649,385 | 3/1987 | Aires et al. ............................ 379/57 |
| 4,701,943 | 10/1987 | Davis et al. |
| 4,763,353 | 8/1988 | Canale et al. ......................... 379/67 |
| 4,879,743 | 11/1989 | Burke et al. .......................... 379/67 |
| 4,882,744 | 8/1988 | Hashimoto . |
| 4,926,460 | 5/1990 | Gutman et al. ....................... 379/57 |

OTHER PUBLICATIONS

Inbound/Outbound Magazine, "Let Customers Reach the Right Person Faster", (Automated Attendants), Jul. 1990, by C. Ives, pp. 20, 21, 23, 24, 26 and 28.
Teleconnect magazine, "Call Processing: Winning The Ware Against Caller Neglect", (Hello? a roundup of Automated Attendants and Digital Announcers), May 1988, by M. Robins, pp. 102, 103, 106-108, 110-114, 116, 118-120, 122-126, 128-138, 140, (379/88).

Primary Examiner—James L. Dwyer
Assistant Examiner—Dwayne D. Bost
Attorney, Agent, or Firm—David J. Larwood

[57] ABSTRACT

A method and system for establishing a telephone connection between a calling party and a paged party. When a calling party initiates a telephone call to a local area telephone system embodying the invention, a PBX serving the system transfers the call to voice processing equipment ("VPM"). The VPM responds by sending a voice menu to the caller over a telephone line. The voice menu provides the caller an option to page the called party, and preferably also provides the other options typically available in conventional voice mail and automated attendant systems. In response to selection of the paging option by the caller, an RF paging signal is transmitted to the paged party by a set of radio transmitters. The paged party carries a badge designed to vibrate (or otherwise signal the badge holder) upon reception of a paging signal intended for the paged party. In response to the paging signal, the paged party may go to the nearest telephone, and use the telephone key pad to instruct the VPM to establish a direct connection between the paged party's line and the caller's line. The invention enables a PBX system with only a few shared telephones to serve many people efficiently, enables more complete integration of PBX system users with a telecommunications/voice system, and enables employers to remain in close contact with their employees. No human operator is required to perform the functions of the inventive system.

9 Claims, 2 Drawing Sheets

PAGING SYSTEM FOR ESTABLISHING TELEPHONE CONNECTION BETWEEN CALLING PARTY AND PAGED PARTY

FIELD OF THE INVENTION

The invention is a method and system for establishing a telephone connection between a calling party and a paged party. More particularly, the inventive system is a local area telephone network, including an automatic radio paging means having a range limited to a local area and which can operate in conjunction with a voice processing unit, and also including a means for establishing a direct telephone connection between a caller and a paged party.

BACKGROUND OF THE INVENTION

In one type of conventional paging system, described for example in United Kingdom Patent Application 2,208,777A, published Apr. 12, 1989, a voice mail unit automatically pages a subscriber each time the voice mail unit records a message for the subscriber from a caller. More specifically, the voice mail unit commands a paging unit to send a radio signal to the subscriber. The paging signal may indicate the telephone number of the caller, or may merely indicate that an unidentified caller has recorded a voice message for the subscriber. However, in such conventional systems, the caller hangs up his (or her telephone after causing a message to be recorded in the voice mail unit.

Until the present invention, it has not been known how automatically to establish a direct telephone connection between a caller and a paged party using radio signals restricted to a specific local area. Nor has it been known how a caller may access a local area telephone network (sometimes denoted herein as a "PBX" system since many conventional local area telephone networks employ private branch exchange, or "PBX," equipment), command an element of the PBX system to send a limited-range low power RF paging signal to a party, and remain connected to the system until the paged party initiates a simple cross-connection (typically, an analog cross-connection) to establish a direct telephone connection with the caller.

SUMMARY OF THE INVENTION

The invention is a method and system for establishing a direct telephone connection between a calling party and a paged party through the use of a low power, site specific RF paging network and a PBX telephone network operating in parallel with the paging network. When an internal or external calling party initiates a telephone call to a telephone network embodying the invention, the network transfers the call to a voice signal processing means ("VPM"), which may be an adjunct processing unit ("APU") or may include both a voice processing unit ("VPU") and an APU. The VPM responds by sending a voice menu to the caller over a telephone line. The voice menu may provide the caller an option to "page" the called party, and preferably also provides the other options typically available in conventional voice mail and automated attendant systems.

In response to selection of the "paging" option by the caller, the APU sends a paging signal to a site-specific radio transmission means (which may be positioned to provide limited coverage to an office, a factory, or the like). In an embodiment which includes both an APU and a VPU, the VPU transfers the caller to the APU and preferably also transmits additional information causing the APU to transmit the paging signal, and the VPU may also send pertinent in-band or out-of-band information to the APU. The paging signal may indicate the telephone number (or PBX extension) of the paging party and a code identifying the paged party. The paged party carries a badge designed to vibrate (or otherwise signal the badge holder) upon reception of a radio frequency paging signal including the paged party's identification code.

In response to the paging signal, the paged party may go to the nearest telephone (within the specific local telephone area network), and use the telephone key pad to access the APU and identify himself (or herself, as the paged party. In response to this action by the paged party, the APU establishes a direct connection between the paged party's line and the caller's line.

If the paged party fails to respond to the paging signal within a selected period of time (for example, thirty seconds), the VPM will send another voice menu to the caller (for example, a voice menu prompting the caller to hold while the APU continues to try to locate the paged party, to transfer to a voice box to record a message for the paged party, or to transfer to a human operator).

An important benefit of the invention is that it enables a PBX system with only a few shared telephones to serve many people efficiently, since the inventive APU allows those people sharing the telephones to configure their badges so that they will be alerted whenever they receive an incoming call (regardless of their proximity to any particular telephone). The invention is not merely a paging system. Instead, the invention enables more complete integration of PBX system users with a telecommunications/voice system, and enables employers to remain in close contact with their employees. No human operator is required to perform the functions of the inventive system. Employees need not wear bulky conventional beepers to use the inventive system. Rather, they need only wear a modified version of their company badge.

DETAILED DESCRIPTION OF THE PREFERRED EMBODIMENTS

An important objective of the invention is to enable a telephone caller to cause a paging signal to be transmitted by a radio network (which operates in parallel with one or more local area telephone networks) to a "paged party," and enable the paged party to respond to the paging signal by establishing a direct telephone connection with the caller. The paged party may respond to the paging signal by causing an adjunct processing unit (described below) to execute a direct cross-connection (typically a direct analog cross-connection) with the caller, while the caller remains on a line within one of the local area telephone networks. Once a caller is connected with the inventive system, the caller is never disconnected until he or she is given the option to page the called party by radio, and is preferably also given the option to record a voice message for the paged party in the event that the paged party does not respond to the radio page.

Figure 1:
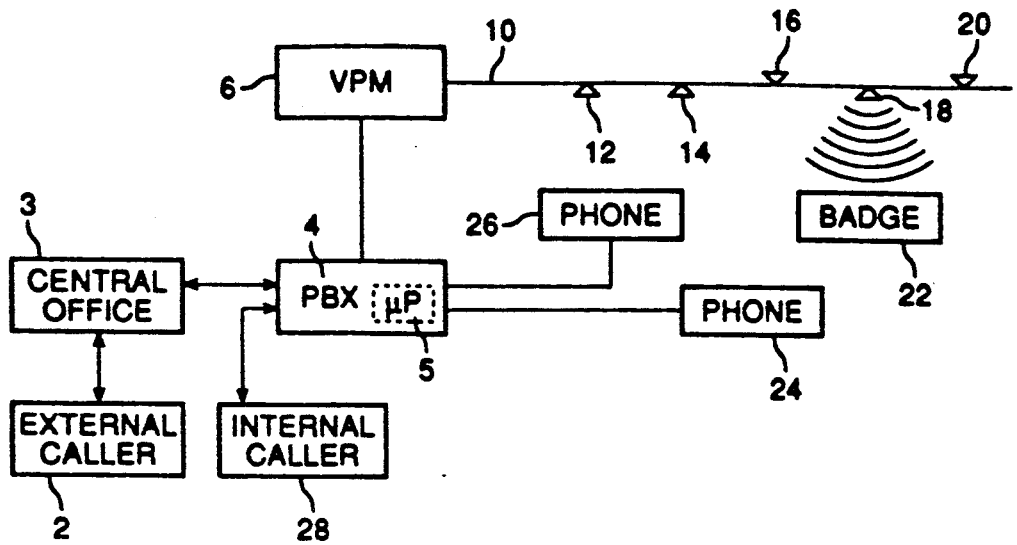
FIG. 1 is a block diagram of a preferred embodiment of the inventive system.

In the embodiment shown in FIG. 1, the invention includes exchange means 4 (which may be a private branch exchange or computerized branch exchange, and will be referred to herein interchangeably as "private branch exchange" 4, "PBX" 4, and computerized branch exchange 4), and voice processing means 6 (sometimes referred to herein as "VPM" 6) connected to PBX 4. VPM 6 performs conventional voice menu generation functions in addition to the new, inventive functions to be described below.

VPM 6 may be a conventional adjunct processing unit ("APU"), of the type capable of being programmed to generate and send a voice menu, and to control peripheral equipment (such as a set of radio transmitters), either in response to commands entered by a caller in response to the voice menu, or automatically after sending the voice menu.

Figure 3:
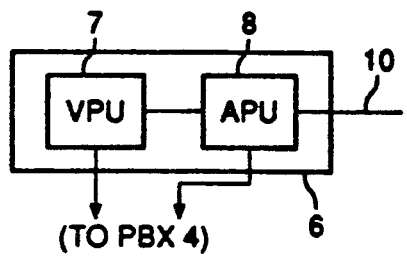
FIG. 3 is a block diagram of a preferred embodiment of the voice processing means of the FIG. 1 system.

Alternatively, VPM 6 may include the components shown in FIG. 3. As shown in FIG. 3, VPM 6 includes a conventional voice processing unit 7 connected to PBX 4 and an adjunct processing unit ("APU") 8 connected to VPU 7. Preferably, VPU 7 and APU 8 are connected together by an RS232 serial input/output link. VPU 7 performs conventional voice mail and automated attendant functions for the telephones connected to PBX 4 (such as telephones 24, 26, and 28 shown in FIG. 1), in addition to the new, inventive functions of VPM 6 to be described below. Each of VPU 7 and APU is directly connected to PBX 4.

With reference again to FIG. 1, telephones 24, 26, and 28 (and any number of additional telephones not shown in FIG. 1) connected to PBX 4 and served by VPU 6 will sometimes be referred to herein as stations "on" the local area telephone network, or "internal" stations. In contrast, telephones that may access PBX 4 only through telephone company central office equipment 3 will sometimes be referred to herein as stations "off" the local area telephone network, or "external" stations.

The local area telephone network of the invention will sometimes referred to herein as a "PBX" network, although exchange means 4 may be a computerized branch exchange, rather than a private branch exchange. When an external calling party dials an extension on the PBX network using external station 2, central office equipment 3 and PBX 4 connect station 2 with VPM 6, and VPM 6 sends a voice menu (to be described below with reference to FIG. 4) to station 2. Preferably, PBX 4 includes telephone ports and a telephone line cross-connection means (not shown) for connecting pairs of the ports, and preferably includes processing means 5 which may be programmed either to route all incoming calls initially to VPM 6, or otherwise to route incoming calls.

In a preferred embodiment in which VPM 6 includes a VPU having automated attendant capability, in response to entry of an extension by a caller, the automated attendant means within VPM 6 rings the extension. If VPM 6 determines that this attempt results in a ring no answer (RNA) or a busy signal, VPM 6 provides the caller with a second voice menu, which prompts for the caller to select an automated paging option, and preferably also prompts the caller to record a voice message, enter another extension, or reach an operator.

Often, the caller will be satisfied to record a voice message for an unavailable party, or to transfer to another party. However, in certain circumstances (such as when dealing with time critical information), neither alternative is desirable. In such cases, the caller may wish to cause a limited-range radio paging signal (having a range restricted to the area served by a PBX network, for example) to be sent to the unavailable party while the caller remains on the telephone line.

If the caller selects the "paging" option on the second voice menu, VPM 6 keeps the caller on hold while it commands APU 8 to send a radio frequency paging signal to a radio transmission means (such as point transmitters 12, 14, 16, 18, and 20 Connected along coaxial cable 10. Transmitters 12-20 preferably operate at low power (avoiding the need for FCC licenses for each site), so as to emit an FCC-compliant radio signal that may be received by badge 22, which is worn by the paged party. The inventive radio transmission means need not include point transmitters (such as point transmitters 12, 14, 16, 18, and 20), and instead may comprise a distributed transmitter and antenna means (which may include, for example, a leaky cable)

In the FIG. 3 embodiment in which VPM 6 includes VPU 7 and APU 8, in response to the caller's selection of the paging option, VPU 6 transfers the caller to APU 8, and APU 8 holds the caller while it send the radio frequency paging signal to the radio transmission means (for example, to the radio transmitters along coaxial cable 10).

Figure 2:
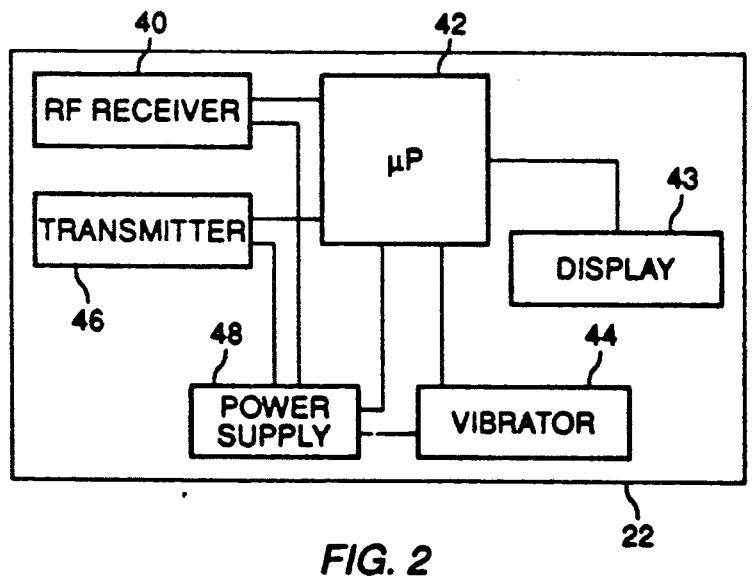
FIG. 2 is a block diagram of a paged party's badge that is suitable for use in the system of FIG. 1.

A preferred embodiment of badge 22 is shown in FIG. 2. Throughout the specification, including in the claims, the term "badge" is used to denote any portable unit capable of being worn by a paged party, which includes a processing means and a transducer of the type described herein. In one preferred embodiment, the badge has roughly the same length and width as a conventional employee identification badge, and has a thickness no more than about four to five times greater than the thickness of a conventional credit card. In such preferred embodiment, the necessary electronic circuitry and processing means is preferably laminated within the badge, and conventional visual (and/or magnetically encoded) identification information is preferably printed on the badge surface. In another preferred embodiment, the badge consists of electronic circuitry enclosed within a housing, and the housing is shaped and dimensioned for convenient attachment to a conventional employee identification badge.

Throughout this specification, including in the claims, the phrase "external RF network" denotes an RF network other than the local RF network including the inventive transmission means (i.e., transmitters 12, 14, 16, 18, and 20 in FIG. 1) whose range is limited to the area of the PBX telephone network.

Badge 22 preferably includes a radio receiver 40, for receiving and demodulating the RF paging signal. Receiver 40 is connected to microprocessor 42, which receives and processes the demodulated paging signal from receiver 40. Alternatively, microprocessor 42 may be replaced by one or more PAL integrated circuits which perform the same functions as would the microprocessor. A radio transmitter 46, and a transducer 44 are also connected to microprocessor 42. Transducer 44 may be a loudspeaker for producing an audible "beep" signal, a vibrating transducer for producing a non-audible vibrating signal that the badge wearer will feel, a display means for displaying visual information, or a combination of two or more of these three types of transducers. Power supply 48 (which may be a battery) supplies electric power to receiver 40, microprocessor 42, transducer 44, and transmitter 46.

If microprocessor 42 determines that the paging signal includes a prestored address signal (i.e., if the paging signal is addressed to the badge wearer), it will send a control signal causing transducer to vibrate (or otherwise) indicate that the badge wearer is being paged. The paging signal may include additional information, such as an indication whether the paging party is at an external or an internal station. In this latter embodiment, microprocessor 42 is preferably programmed to cause transducer to emit a continuous signal to inform the badge wearer that the paging party is an external caller, or a stutter signal to inform the badge wearer that the paging party is an internal caller. Of course, it is contemplated that any two distinguishable transducer signals may be employed to distinguish between pages by external and internal callers.

Badge 22 may also include display means 43, operating under control of microprocessor 42, for displaying the telephone number (or other identifying code) of the paging party, or for displaying the status of the wearer's voice mail box, fax mail box, or any other local area network based information system.

In a preferred embodiment, microprocessor 42 generates status signals in response to reception of RF command signals at receiver 40. Such status signals indicate such information as the location of the badge, and are transmitted in the form of radio signals from transmitter 46. In this embodiment, transmitters 12-20 along cable 10 are transceivers, and each includes means for receiving the radio status signals. The demodulated status signals propagate from transceivers 12-20 through cable 10 to APU 8 for subsequent processing.

In another class of preferred embodiments, badge 22 is passive, in the sense that it does not include a radio transmitter 46, and does not transmit RF status signals to remote transceivers.

In order to respond to the radioed paging signal, the badge wearer goes to the nearest telephone (telephone 24, in FIG. 1) and initiates a direct cross-connection (typically a direct analog cross-connection) with the caller (who has been kept on hold during the paging operation). In one preferred embodiment, the paged party uses the telephone key pad to access VPM 6 (or, in an embodiment in which VPM includes a VPU and an APU, to access the APU within VPM 6) and identify himself as a paged party by entering a control character (for example, an # or * character) and his current telephone extension (and optionally also a passcode). Alternatively, the VPM (or APU) may be programmed so that the paged party need not enter such an identifying control character to initiate a direct cross-connection with the paging party. In response to the information entered by the paged party, the VPM (or APU) will execute a direct cross-connect operation to connect the stations of the caller and the paged party. The system performs the cross-connection equally well regardless of whether the caller is an external caller (connected to PBX 4 through central office 3) or internal caller (connected directly to PBX 4).

Preferably, receiver 40 is normally maintained in an inactive state, and processor 42 is programmed to "wake up" receiver 40 periodically (i.e., cause power supply 48 to supply power periodically to receiver 40 to activate the receiver). Preferably, following each period of inactivity, power is supplied to receiver 40 for a short duration in response to a demodulated paging signal having a first code (received during a previous "active" period of the receiver), and power is supplied to receiver 40 for a longer duration in response to a demodulated paging signal having a second code (received during a previous "active" period of the receiver).

It is contemplated that an active period having the mentioned short duration will be sufficient to enable badge 22 to scan a small number (for example, fifteen) of transmitted paging signal address codes, while an active period with said longer duration will be necessary to enable badge 22 to scan a larger number (for example, twenty) of transmitted paging address codes. The system may transmit the first code to indicate that it will transmit only short sequences of radio paging signals (for example, sequences of no more than fifteen consecutive address codes), and may transmit the second code to indicate that it will transmit longer sequences of radio paging signals (for example, sequences of up to twenty consecutive address codes). In this embodiment, badge 22 will operate in a low power consumption mode when VPM 6 is transmitting only short sequences of radio paging signals, and badge 22 will automatically enter a higher power consumption mode when VPM 6 is transmitting longer sequences of radio paging signals.

In another preferred embodiment, VPM 6 normally transmits a short address code for each badge, but VPM 6 may be commanded to transmit a long address code to any desired badge. For example, when a badge 22 is in its home local area (i.e., the area served by PBX 5, near transmitters 12, 14, 16, 18, and 20, and near telephones 24, 26, and 28), it will respond to a short address code in the paging signals from VPM 6. If then badge 22 is taken to a remote local area (for example, a local area served by another PBX, not shown in FIG. 1, connected to central office equipment 3), the badge is scanned (for example, using a scanning input device 38 of the type described below with reference to FIG. 5) to input relevant long address information into the local VPM. In response, the VPM transmits a long address code to identify the badge in response to each paging request for the badge. This is desirable since the likelihood of misidentification of any given badge (a "first" badge) is typically greater in the case that the first badge is located in a remote local area (where other badges may be programmed to respond to the same short address code as the first badge), than in the case that the first badge is located in its home local area (where, typically, no other badges will be programmed to respond to the same short address code as the first badge). When the badge is returned to its home local area, VPM 6 will again transmit the short address code, and the badge will revert to its normal operating mode in which it responds to the short address code.

In an alternative embodiment in which the badge includes a transmitter 46, and units 12-20 along cable 10 are transceivers capable of receiving radio status signals from the badge, VPM 6 is programmed to monitor the badge's position by processing address and position signals transmitted from the badge, and to transmit long address codes to a badge located away from its home local area.

The ability to configure RF receivers to respond to short or long address codes and to control a flexible wake state to match the current RF traffic conditions experienced at the VPM can greatly reduce badge power consumption. Local area networks embodying the invention, whether separated by a half mile or nine thousand miles, may operate in the same or different wake state or address code mode, and each of their paging signal reception devices (badges) will enter an appropriate operating mode upon receiving appropriate control signals from the nearest VPM.

Figure 5:
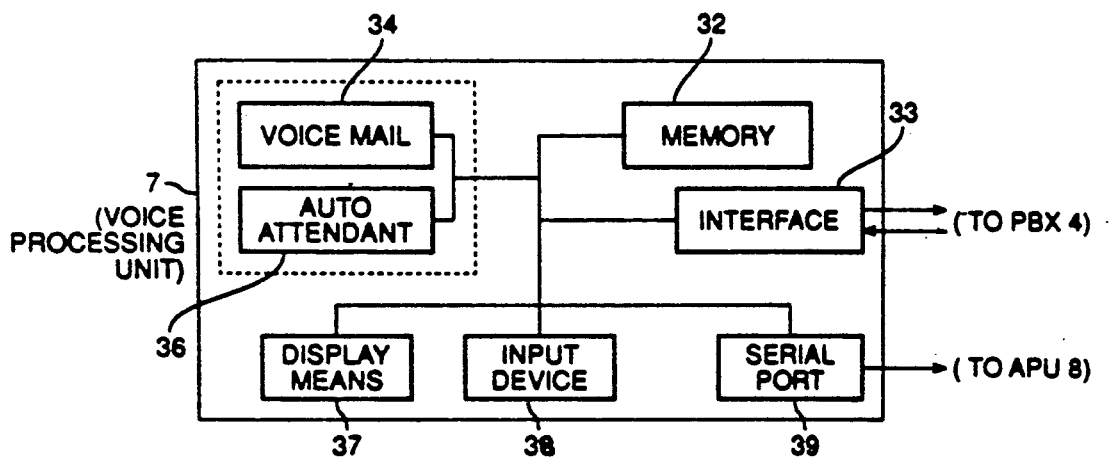
FIG. 5 is a block diagram of a preferred embodiment of the voice processing unit of the system of FIG. 3.

A preferred embodiment of VPU 7 (of FIG. 3) will next be described with reference to FIG. 5. In this embodiment, VPU 7 includes microprocessor 30 (which may be a Model 80386 integrated circuit, available from Intel Corporation), memory means 32, telephone interface 33 (for interfacing with PBX 4), display means 37, input device 38 (which may be a keyboard), and input/output port 39 (for interfacing with APU 8). Port 39 may be a serial port or a non-serial port.

Microprocessor 30 is programmed to perform conventional voice mail and automated attendant operations (as indicated schematically by the presence of voice mail module 34 and auto attendant module 36 within microprocessor 30), and to perform the inventive method steps to be described with reference to FIG. 4. Input device 38 and display means 37 are provided in order to enable users to control operation of the system, for example by changing user-configurable paging access levels or otherwise reprogramming microprocessor 30. Alternatively, user-configurable access levels may be configured directly on APU 8 (and other administrative information provided directly to APU 8).

Figure 4:
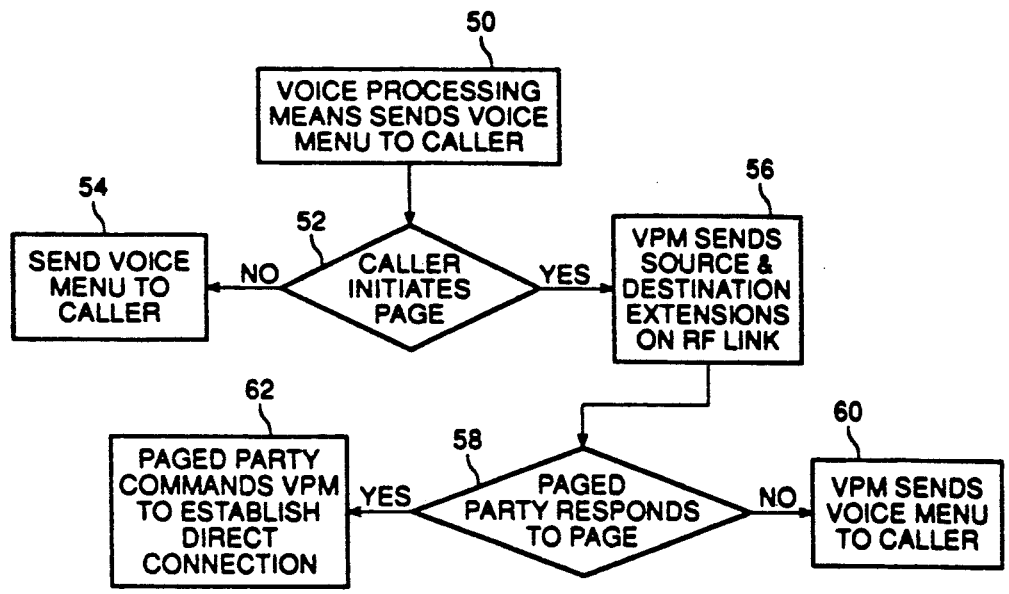
FIG. 4 is a flow diagram showing the principal steps performed in a preferred embodiment of the inventive method.

FIG. 4 is a flow chart showing the principal steps of the inventive method. In response to an external or internal telephone call (i.e., when VPM 6 is connected to an external or internal caller by PBX 4), the initial step (step 50) is to send the caller a first voice menu. Preferably the first menu is generated by an automated attendant means within a VPU of the type shown in FIG. 5), and the first menu prompts the caller to select (preferably by entering DTMF tones using a telephone keypad) one of several options such as: to dial the called party's extension, to store a voice message in a specified voice message file (mailbox), or to page the caller by radio.

The caller selects one of the menu options at step 52. If the caller does not select the paging option, he receives one or more voice menus prompting additional action (at step 54). If the caller selects the paging option, he designates the telephone extension (or other identification number) of the party to be paged. In response, the caller is placed "on hold" and a radio paging signal is transmitted to the paged party over an RF link (at step 56). The system's VPM initiates transmission of the paging signal in step 56. Preferably, the VPM includes a VPU which commands a separate APU (linked to the VPU by a communications link) to transmit the paging signal.

The paging signal includes the telephone extension of the paged party (or another identification of the paged party), and may include the telephone number (or PBX extension) of the paging party. If the paged party determines that the paging signal is addressed to him such as if the paged party carries a comparator/beeper circuit which identifies and announces a match between the transmitted identification and a identification stored in the comparator), the paged party will elect whether to respond to the page (at step 58). In one preferred embodiment, the paged party learns the telephone number of the paging party before deciding whether to respond to the page. If the paged party fails to respond to the page within a pre-determined time period (such as 30 seconds), step 60 is performed to send the caller an additional voice menu (or voice menus) prompting additional action, such as recording a voice message for the paged party or commanding the automated attendant to transfer him to another extension. If the paged party elects to respond to the page, he commands the VPM (or the APU within the VPM) to establish a direct telephone connection between him and the caller (at step 62), such as by operating the nearest telephone handset in order to enter such command.

Various modifications and alterations in the structure and method of operation of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A system for establishing a telephone connection between a calling party and a called party, including:
   a local telephone network including a plurality of phone lines, which includes an exchange means and serves a local area;
   radio paging equipment for transmitting a limited-range radio paging signal, having range limited to the local area, wherein the radio paging signal identifies the called party;
   voice processing means connected between the radio paging equipment and the exchange means, wherein the voice processing means includes means for a called party to establish a plurality of access levels for selected types of calling parties, and a means for placing the calling party on hold and commanding the radio paging equipment to transmit the radio paging signal, in respect to a paging command generated by the voice processing means, whereby the menu and actions available to a specific calling party depends on the access level appropriate for the type of calling party.

2. A method for a calling party to signal a paged party, including the steps of:
   (a) establishing a short address and a long address for a paged party;
   (b) in response to reception, at a voice processing means, of a paging command from the calling party, transmitting a short address radio paging signal which identifies the paged party;
   (c) receiving the paging signal at a plurality of reception devices responsive to the short address signal;
   (d) detecting a plurality of confirmation signals, each from a responsive reception device;
   (e) transmitting a long address radio paging signal which identifies the paged party;
   (f) receiving the paging signal at a reception device adjacent to the paged party; and
   (g) scanning to detect a confirmation signal from the reception device.

3. A system for establishing a telephone connection between a calling party and a called party, including:

a local telephone network including a plurality of phone lines, which includes an exchange means and serves a local area;

radio paging equipment for transmitting a limited-range radio paging signal, having range limited to the local area, wherein the radio paging signal identifies the called party;

voice processing means connected between the radio paging equipment and the exchange means, wherein the voice processing means includes menu means for sending a voice menu to the calling party to prompt the calling party with a plurality of optional actions, said menu means including the optional action of paging the called party so that the called party is also a paged party, a means for placing the calling party on hold and commanding the radio paging equipment to transmit the radio paging signal, in respect to a paging command generated by the voice processing means; and a paging signal reception device, including a means for receiving the paging signal and signalling the paged party upon reception of the signal;

said paging signal reception device comprising:
a radio receiver for receiving and demodulating the paging signal;
a power supply connected to the radio receiver;
a processing means connected to the radio receiver and the power supply, for receiving and processing the demodulated paging signal from the radio receiver, wherein the processing means is programmed to cause the power supply to power the radio receiver for a first duration in response to a demodulated paging signal having a first code to cause the power supply to power the radio receiver for a second duration longer than the first duration in response to a demodulated paging signal having a second code; and
a transducer connected to the processing means, for signalling the paged party in response to a signalling command from the processing means, wherein the processing means is programmed to cause the transducer to emit the signalling command in response to a demodulated paging signal having a first address code.

4. A method for establishing a telephone connection between a calling party and a called party, including the steps of:
(a) prompting the calling party to send a paging command to page a called party as a paged party,
(b) in response to reception, at a voice processing means, of a paging command from the calling party, placing the calling party on hold and transmitting a radio paging signal which identifies the paged party;
(c) receiving the paging signal at a reception device adjacent to the paged party;
(d) in response to reception of the paging signal, commanding an adjunct processing unit, connected to an exchange means of a local area telephone network serving a local area, to establish a direct telephone connection between the paged part and the calling party;
(e) causing the reception device to enter a high power consumption mode in response to extraction of a first mode control code form the paging signal; and
(f) causing the reception device to enter a low power consumption mode in response to extraction of a second mode control code from the paging signal.

5. A method for establishing a telephone connection between a calling party and a called party, including the steps of;
(a) prompting the calling party to send a paging command to page a called party as a paged party,
(b) in response to reception, at a voice processing means, of a paging command from the calling party, placing the calling party of hold and transmitting a radio paging signal which identifies the paged party;
(c) receiving the paging signal at a reception device adjacent to the paged party;
(d) in response to reception of the paging signal, commanding an adjunct processing unit, connected to an exchange means of a local area telephone network serving a local area, to establish a direct telephone connection between the paged part and the calling party;
(e) scanning the reception device to extract a long address signal therefrom; and
(f) supplying the long address signal to the voice processing means, wherein upon receiving the long address signal, the voice processing means transmits a radio paging signal including a long address which identifies the paged party in response to the paging command.

6. A method for establishing a telephone connection between a calling party and a called party, including the steps of:
(a) prompting the calling party to send a paging command to page a called party as a paged party,
(b) in response to reception, at a voice processing means, of a paging command from the calling party, placing the calling party of hold and transmitting a radio paging signal which identifies the paged party, said radio paging signal normally including a short address code which identifies the paged party;
(c) receiving the paging signal at a reception device adjacent to the paged party;
(d) in response to reception of the paging signal commanding an adjunct processing unit, connected to an exchange means of a local area telephone network serving a local area, to establish a direct telephone connection between the paged party and the calling party;
(e) scanning the reception device to generate a long address signal; and
(f) supplying the long address signal to the voice processing means;
wherein, following reception of the long address signal, the voice processing means includes in the radio paging signal a long address code which identifies the paged party, rather than said short address code which identifies the paged party.

7. A method for establishing a telephone connection between a calling party and a called party, including the steps of:
(a) prompting the calling party to send a paging command to page a called party as a paged party,
(b) in response to reception, at a voice processing means, of a paging command from the calling party, placing the calling party of hold and transmitting a radio paging signal which identifies the paged party, said radio paging signal normally including a short address code which identifies the paged party;

(c) receiving the paging signal at a reception device adjacent to the paged party;

(d) in response to reception of the paging signal commanding an adjunct processing unit, connected to an exchange means of a local area telephone network serving a local area, to establish a direct telephone connection between the paged party and the calling party; and (e) supplying location information and long address information to the voice processing means when a paged party takes a receiving device to a remote local area, wherein, following a call to the paged party, the voice processing means includes in the radio paging signal a long address code which identifies the paged party, rather than the short address code which identifies the paged party.

8. A method for establishing a telephone connection between a calling party and a called party, including the steps of:

(a) the called party establishing a plurality of access levels for a voice processing means for selected types of calling parties, whereby menus and actions available to a specific calling party depends on the access level appropriate for the type of calling party;

(b) prompting the calling party to send a paging command to page a called party as a paged party, (c) in response to reception, at a voice processing means, of a paging command from the calling party, placing the calling party on hold and transmitting a radio paging signal which identifies the paged party, said radio paging signal normally including a short address code which identifies the paged party;

(d) receiving the paging signal at a reception device adjacent to the paged party; and (e) in response to reception of the paging signal, commanding an adjunct processing unit, connected to an exchange means of a local area telephone network serving a local area, to establish a direct telephone connection between the paged party and the calling party.

9. The method of claim 8 wherein certain types of calling parties are allowed to page the called party and other types of calling parties are not allowed to page the called party.

* * * * *